(12) United States Patent
Nakamura (10) Patent No.: US 10,764,445 B2
(45) Date of Patent: Sep. 1, 2020

(54) IMAGE FORMING APPARATUS

(71) Applicant: KYOCERA Document Solutions Inc., Osaka (JP)

(72) Inventor: Shigeaki Nakamura, Osaka (JP)

(73) Assignee: Kyocera Document Solutions, Inc. (JP)

( * ) Notice: Subject to any disclaimer, the term of this patent is extended or adjusted under 35 U.S.C. 154(b) by 0 days.

(21) Appl. No.: 16/410,568

(22) Filed: May 13, 2019

(65) Prior Publication Data

US 2019/0356793 A1    Nov. 21, 2019

(30) Foreign Application Priority Data

May 15, 2018   (JP) .................................. 2018-094179

(51) Int. Cl.
  *H04N 1/00*     (2006.01)
  *H04N 1/047*    (2006.01)
  *H04N 1/12*     (2006.01)

(52) U.S. Cl.
  CPC ..... *H04N 1/00206* (2013.01); *H04N 1/00082* (2013.01); *H04N 1/00167* (2013.01); *H04N 1/047* (2013.01); *H04N 1/121* (2013.01)

(58) Field of Classification Search
  None
  See application file for complete search history.

(56) References Cited

U.S. PATENT DOCUMENTS

| | | | |
|---|---|---|---|
| 5,359,391 A | 10/1994 | Kuroyanagi et al. | |
| 6,721,879 B1 * | 4/2004 | Tanaka | G06F 1/24 713/1 |
| 2007/0170634 A1 * | 7/2007 | Kotani | B65H 29/51 270/58.04 |
| 2016/0360497 A1 * | 12/2016 | Maruyama | H04L 65/608 |

FOREIGN PATENT DOCUMENTS

JP    H04-318743    11/1992

* cited by examiner

*Primary Examiner* — Frantz Bataille (57) ABSTRACT

An image forming apparatus includes plural internal devices, a controller, and a communication path. The controller is configured to control the plural internal devices. The communication path is used for communication between the plural internal devices and the controller. Usage priority of the communication path is assigned to plural pieces of communication between the plural internal devices and the controller in a time divisional manner. The controller detects a status change of the image forming apparatus, and upon detecting the status change, interrupts the time divisional manner with a time slot of a specific internal device among the plural internal devices, the specific internal device corresponding to the status change.

6 Claims, 7 Drawing Sheets

IMAGE FORMING APPARATUS

CROSS-REFERENCE TO RELATED APPLICATIONS

This application relates to and claims priority rights from Japanese Patent Application No. 2018-094179, filed on May 15, 2018, the entire disclosures of which are hereby incorporated by reference herein.

BACKGROUND

1. Field of the Present Disclosure

The present disclosure relates to an image forming apparatus.

2. Description of the Related Art

A copier usually establishes communication with a specific external device. However, if the copier can not establish communication with a specific external device among plural external devices, the copier automatically performs data communication with another external device.

The aforementioned copier performs data communication with another external device when communication can not be established with the specific external device, and if communication can be established with the specific external device, then the copier fixedly performs communication with the specific external device.

Meanwhile, an image forming apparatus such as printer or multi function peripheral includes a controller and plural internal devices, and the controller performs communication with the plural internal devices. In such image forming apparatus, if a communication counterpart is fixedly selected when communication can be established in the same manner as the aforementioned copier, then regardless of a status of the image forming apparatus, such communication may be performed improperly.

SUMMARY

An image forming apparatus according to an aspect of the present disclosure includes plural internal devices, a controller, and a communication path. The controller is configured to control the plural internal devices. The communication path is used for communication between the plural internal devices and the controller. Usage priority of the communication path is assigned to plural pieces of communication between the plural internal devices and the controller in a time divisional manner. The controller detects a status change of the image forming apparatus, and upon detecting the status change, interrupts the time divisional manner with a time slot of a specific internal device among the plural internal devices, the specific internal device corresponding to the status change.

These and other objects, features and advantages of the present disclosure will become more apparent upon reading of the following detailed description along with the accompanied drawings.

DETAILED DESCRIPTION

Hereinafter, embodiments according to an aspect of the present disclosure will be explained with reference to drawings.

Embodiment 1

Figure 1:
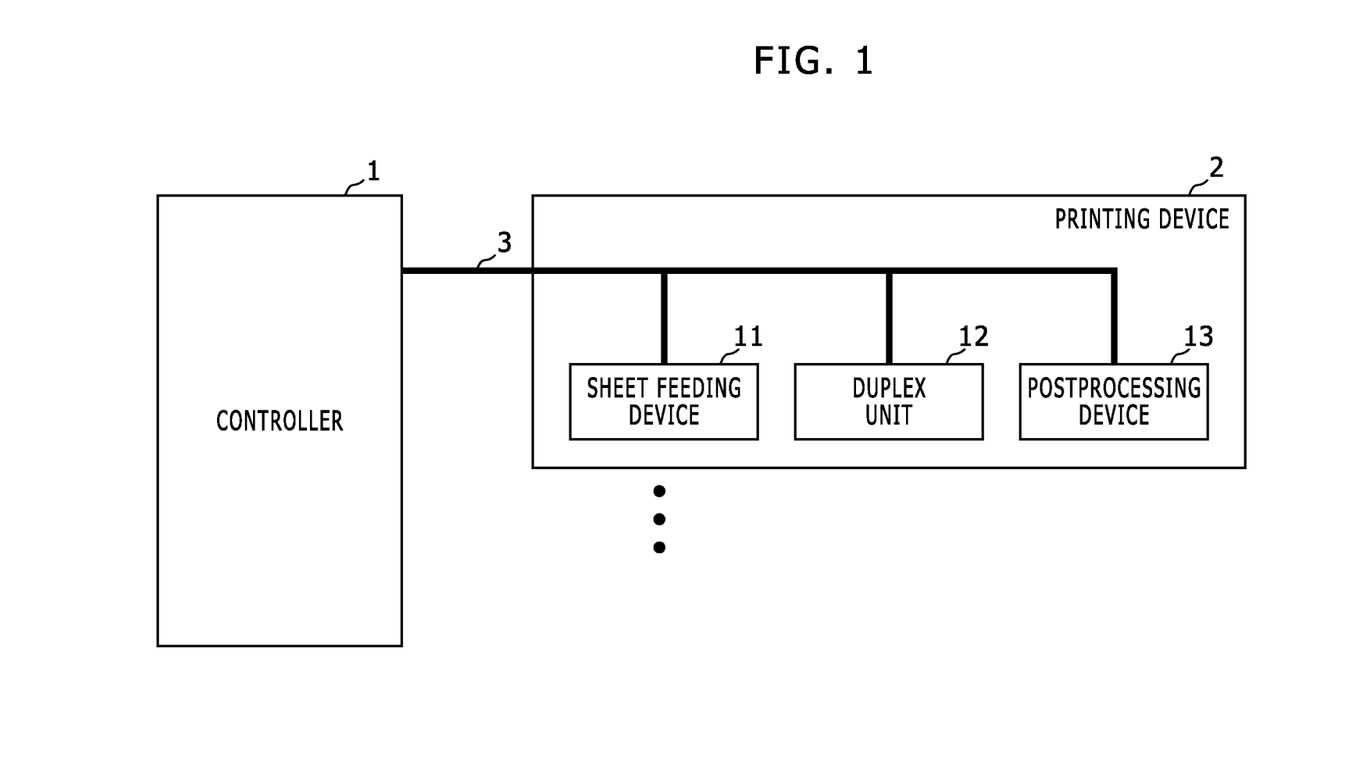
FIG. 1 shows a block diagram that indicates a configuration of an image forming apparatus according to an embodiment of the present disclosure.

FIG. 1 shows a block diagram that indicates a configuration of an image forming apparatus according to an embodiment of the present disclosure. The image forming apparatus shown in FIG. 1 is an apparatus having a printing function such as a printer or a multi function peripheral. This image forming apparatus includes a controller 1, a printing device 2, and a communication path 3.

The controller 1 includes a computer, an ASIC (Application Specific Integrated Circuit) and/or the like and thereby acts as sorts of processing units with software and/or hardware, watches and controls plural internal devices, and performs sorts of data processing.

The controller 1 receives a job request received by a communication device (not shown) from an external device (not shown), a job request based on a user operation detected by an operation panel (not shown) or the like, and performs a job (e.g. print job) corresponding to the job request using one or more of the internal devices.

Here, the printing device 2 includes a photoconductor drum, an exposure device, a developing device, a fuser and the like for an electrographic process. The printing device 2 prints a document image in an electrographic manner or the like.

Further, the printing device 2 includes plural internal devices such as a sheet feeding device 11, a duplex unit 12 and a postprocessing device 13. The sheet feeding device 11 is an internal device that includes a removal sheet cassette and feeds a printing paper sheet from the sheet cassette. The duplex unit 12 is an internal device that transports a printing paper sheet in a switch back manner for duplex printing. The postprocessing device 13 is an internal device that performs a post process (sorting, stapling or the like) for a printing paper sheet after fixing process of the fuser.

The communication path 3 is a communication path (e.g. internal bus) used for communication between the plural devices (here, the sheet feeding device 11, the duplex unit 12 and the postprocessing device 13) and the controller 1. In this communication path 3, usage priority of the communication path 3 is assigned to plural pieces of communication between these plural internal devices and the controller 1 in a time divisional manner.

Figure 2:
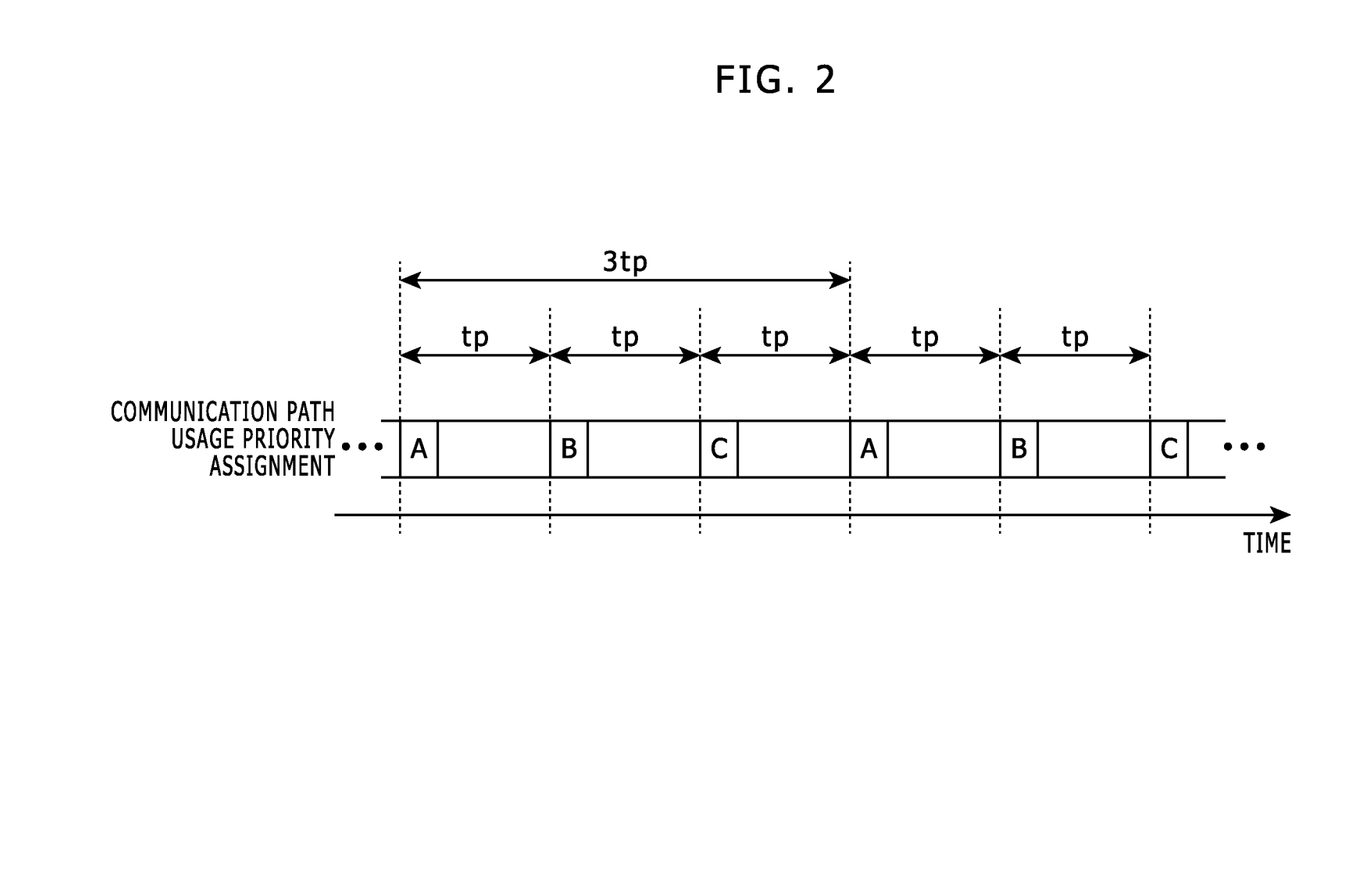
FIG. 2 shows a diagram that explains time slots assigned to three internal devices.

FIG. 2 shows a diagram that explains time slots assigned to three internal devices. As shown in FIG. 2, time slots A, B and C are assigned to three internal devices, respectively, and a time slot (i.e. assignment of usage priority of the communication path 3) is repeatedly changed with a predetermined time interval tp. If one communication path 3 is used for communication of three internal devices, then a time slot of each of the internal devices has a period of 3 tp.

In this embodiment, for communication of the postprocessing device 13 (i.e. unidirectional communication or bidirectional communication between the controller 1 and the postprocessing device 13), the time slot A is assigned; for communication of the sheet feeding device 11 (i.e. unidirectional communication or bidirectional communication between the controller 1 and the sheet feeding device 11), the time slot B is assigned; and for communication of the duplex unit 12 (i.e. unidirectional communication or bidirectional communication between the controller 1 and the duplex unit 12), the time slot C is assigned.

While a specific event that indicates a status change of the image forming apparatus is not detected, the controller 1 evenly assigns the time slots A, B and C.

Contrarily if the controller 1 detects a status change of the image forming apparatus, then the controller 1 interrupts the aforementioned time divisional manner with a time slot of a specific internal device among the plural internal devices. This specific internal device corresponds to the status change.

Specifically, for example, if the controller 1 detects as the aforementioned status change a start of a job that uses a specific internal device, then the controller 1 interrupts the time divisional manner with time slots of this specific internal device, and provides setting data for the job to this specific internal device through these time slots, and the number of the time slots in this interruption corresponds to a size of the setting data. This internal device receives this setting data, and upon receiving the setting data, performs an action in the job in accordance with the setting data. The number of the time slots in this interruption is derived from a time length required to transmit the setting data and a time length of one time slot.

Figure 3:
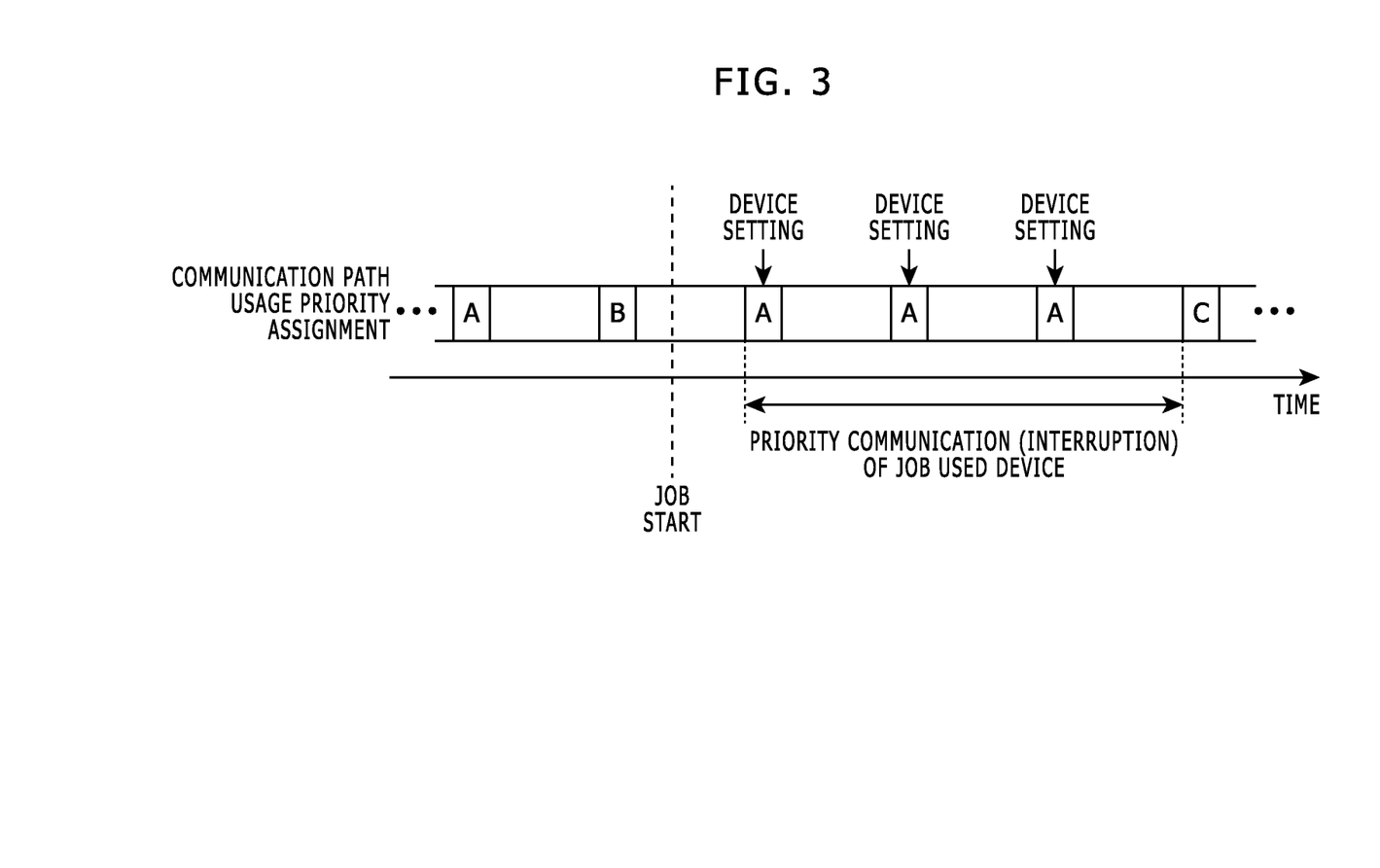
FIG. 3 shows a diagram that explains interruption with a time slot for providing setting data in Embodiment 1.

FIG. 3 shows a diagram that explains interruption with a time slot for providing setting data in Embodiment 1. As shown in FIG. 3, when a start of a job is detected, for transmission of setting data for the job, the controller 1 interrupts the time divisional manner with a time slot A of a specific internal device as a next time slot to a time slot at a timing that the start of the job is detected. Upon finishing the transmission of the setting data, the controller 1 terminates the interruption with the time slot A of the specific internal device, and returns to a default status (i.e. even assignment of time slots).

Further, specifically, for example, if the controller 1 detects as the aforementioned status change a request of an action command to a specific internal device, then the controller 1 interrupts the time divisional manner with a time slot of the specific internal device, and provides the action command to the specific internal device through this time slot. This specific internal device receives the action command, and upon receiving the action command, performs a predetermined action.

Figure 4:
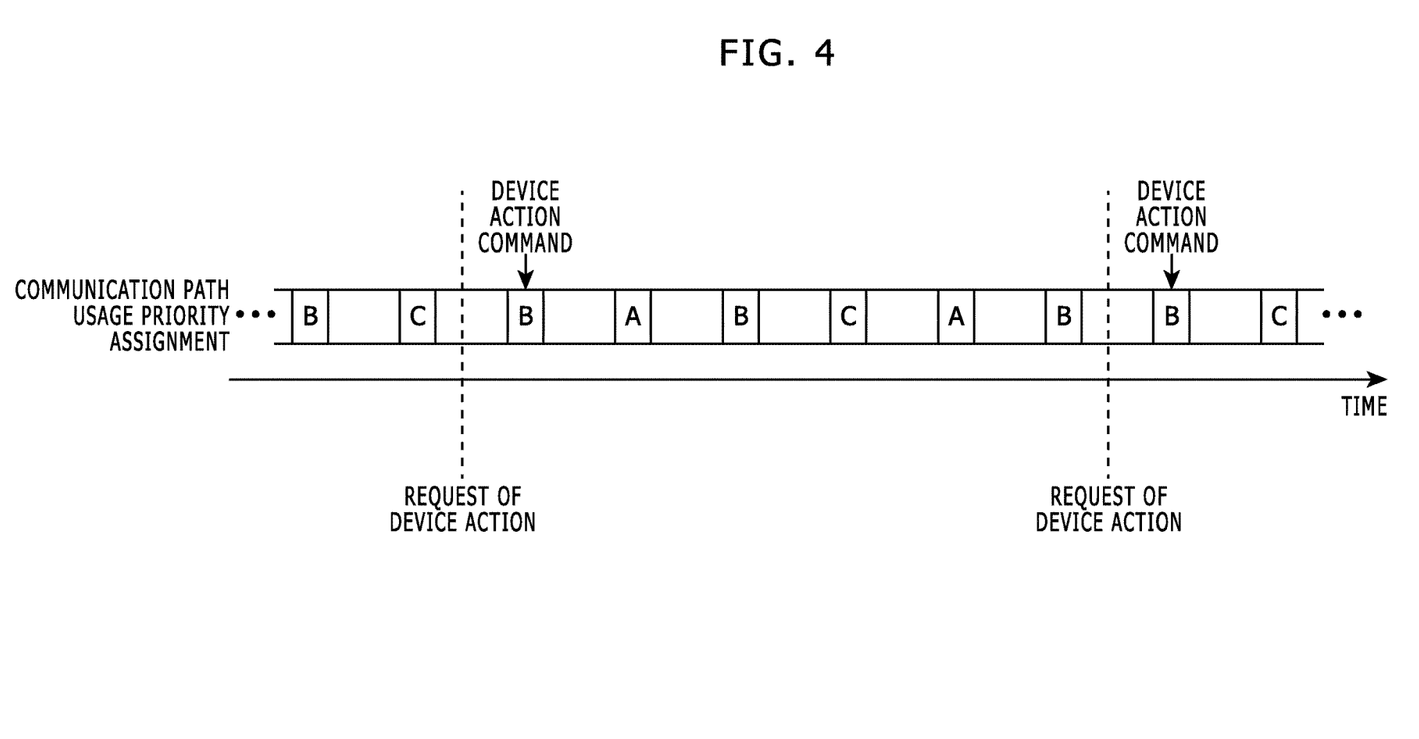
FIG. 4 shows a diagram that explains interruption with a time slot for an action command of a specific internal device in Embodiment 1.

FIG. 4 shows a diagram that explains interruption with a time slot for an action command of a specific internal device in Embodiment 1. As shown in FIG. 4, when an action request to a specific internal device is detected, for transmission of an action command, the controller 1 interrupts the time divisional manner with a time slot B of the specific internal device as a next time slot to a time slot at a timing that the action request is detected. Upon finishing the transmission of the action command, the controller 1 terminates the interruption with the time slot B of the specific internal device, and returns to a default status (i.e. even assignment of time slots).

Furthermore, specifically, for example, if the controller 1 detects as the status change an error of a specific internal device, then the controller 1 interrupts the time divisional manner with a time slot of the specific internal device, and receives error information (i.e. an error type of the error, a status of the error and/or the like) of the specific internal device through this time slot.

Figure 5:
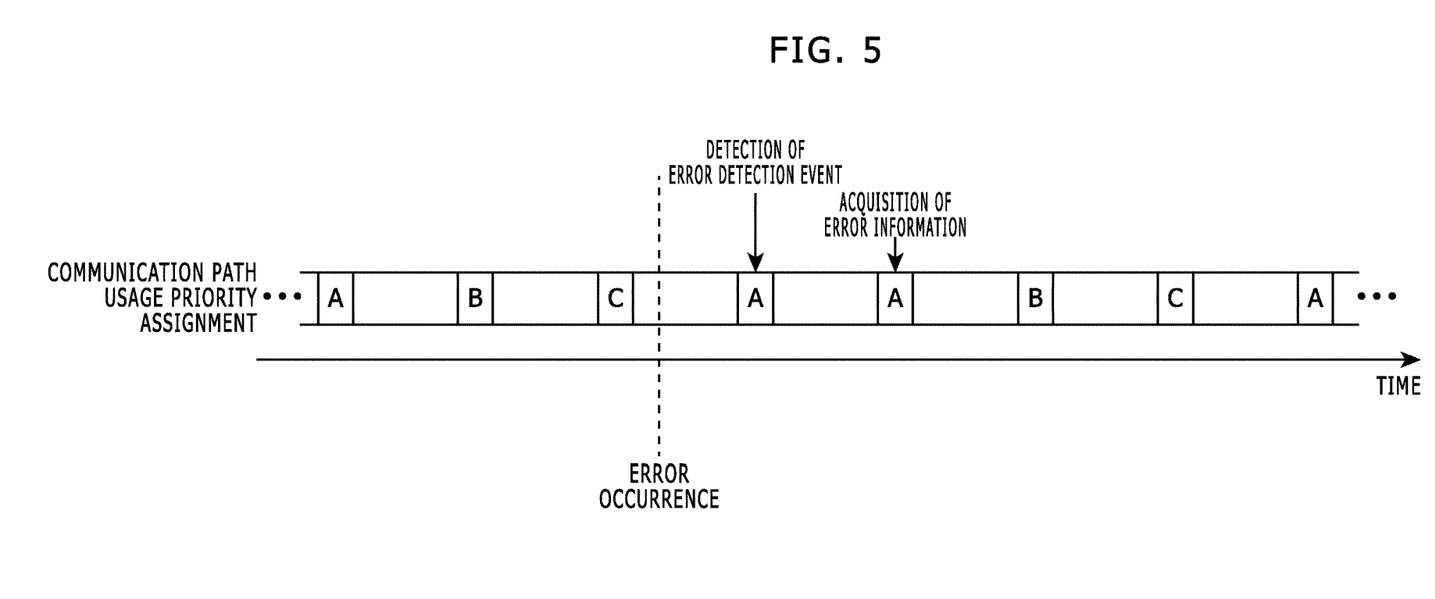
FIG. 5 shows a diagram that explains interruption with a time slot due to error detection on a specific internal device in Embodiment 1.

FIG. 5 shows a diagram that explains interruption with a time slot due to error detection on a specific internal device in Embodiment 1. As shown in FIG. 5, when an error (e.g. jam of printing paper sheet or the like) occurs in an internal device, the internal device detects the error using a sensor (not shown), and notifies the controller 1 of the detection of the error through a time slot A of this internal device. The controller 1 detects an error detection event of this error on the basis of this notification, and upon the detection of the error detection event, performs the interruption with a time slot A of this internal device for acquiring error information of the error detection event. Upon finishing the acquisition of the error information from the internal device, the controller 1 terminates the interruption with the time slot A of this internal device, and returns to a default status (i.e. even assignment of time slots).

Furthermore, specifically, for example, if the controller 1 detects as the status change a maintenance operation (e.g. opening a housing cover, demounting a sheet cassette or the like) to a specific internal device, then the controller 1 continuously and repeatedly interrupts the time divisional manner with a time slot of the specific internal device until detecting termination of the maintenance operation (closing the housing cover, mounting the sheet cassette or the like), receives status information of the specific internal device through this time slot and thereby watches a status of the specific internal device, and detects the termination of the maintenance operation on the basis of the status information.

It should be noted that only in a case that the other internal device(s) is/are in a standby status (i.e. not in use for any jobs) than the internal device to which the maintenance operation is performed, the controller 1 may continuously interrupt with the time slot in the aforementioned manner; and contrarily, if another internal device is not in a standby status than the internal device to which the maintenance operation is performed, the controller 1 may not perform such continuous interruption but perform a default assignment of time slot (here even assignment of time slots).

Figure 6:
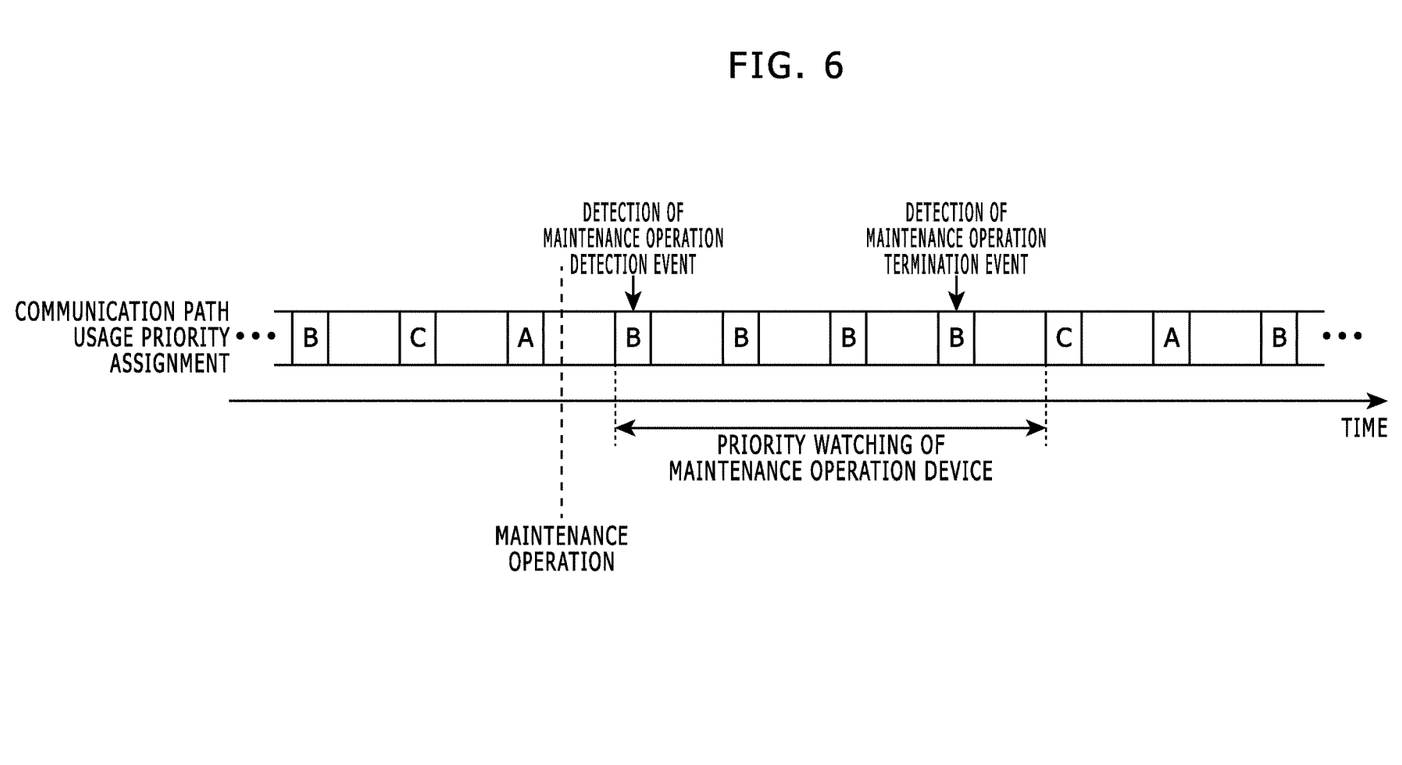
FIG. 6 shows a diagram that explains interruption with a time slot due to an maintenance operation to a specific internal device in Embodiment 1.

FIG. 6 shows a diagram that explains interruption with a time slot due to a maintenance operation to a specific internal device in Embodiment 1. As shown in FIG. 6, upon starting a maintenance operation to an internal device, the internal device detects this manual operation using a sensor (not shown) and notifies the controller 1 of the detection of this manual operation through a time slot B of this internal device. The controller 1 detects a maintenance operation detection event of this maintenance operation on the basis of this notification, and upon the detection of the maintenance operation detection event, continuously performs the interruption with a time slot B of this internal device for watching a status of this internal device. This internal device detects termination of this manual operation using a sensor (not shown), and upon the detection of the termination of this manual operation, notifies the controller 1 of the termination of this manual operation through a time slot B of this internal device. Upon detecting a maintenance operation termination event on the basis of this notification, the controller 1 terminates the interruption with the time slot B of this internal device, and returns to a default status (i.e. even assignment of time slots).

The following part explains a behavior of the image forming apparatus in Embodiment 1.

In a period that no print jobs are not performed, if an internal device does not detect any maintenance operations, the controller 1 evenly assigns time slots A, B and C, as shown in FIG. 2.

Upon receiving a request of a print job, the controller 1 starts the print job, determines one or more internal devices required for the print job, and transmits setting data for the print job to each of the one or more internal devices. For example, if the postprocessing device is used in the print job, as shown in FIG. 3, the controller 1 interrupts the time divisional manner with a time slog A of the postprocessing device 13, and transmits setting data (here, sheet size, sheet output destination, postprocessing mode, sheet transportation linear speed, sheet size correction value and/or the like) to the postprocessing device 13 through this time slot A.

Further, after starting the print job, such that an internal device performs an action according to an action request to the internal device, the controller 1 transmits an action command to the internal device. For example, in the print job, when a sheet transportation request occurs to the sheet feeding device 11, as shown in FIG. 4, the controller 1 interrupts the time divisional manner with a time slot B of the sheet feeding device 11 and transmits the action command to the sheet feeding device 11 through this time slot B.

If an error occurs in an internal device while a job is performed, the controller 1 acquires error information from the internal device and cancels or temporarily stops the job. For example, jam occurs in the postprocessing device 13, as shown in FIG. 5, the postprocessing device 13 detects this jam using a sensor (not shown) and notifies the controller 1 of the occurrence of the jam through a time slot A of the postprocessing device 13. Upon detecting an event of the jam occurrence, the controller 1 performs the interruption with a time slot A of the postprocessing device 13, and acquires error information on the jam (i.e. jam position, cover open, jam type such as sheet transportation delay and/or the like) through this time slot A. It should be noted that when such error is detected while a job is performed, the controller 1 cancels or temporarily stops the job.

Further, upon detecting a maintenance operation in an internal device, the controller 1 preferentially watches a status of this internal device. For example, when a sheet cassette is demounted from the sheet feeding device 11, as shown in FIG. 6, the sheet feeding device 11 detects demounting the sheet cassette using a sensor (not shown), and notifies the controller 1 of the demounting of the sheet cassette through a time slot B of the sheet feeding device 11. Afterward, the controller 1 continuously performs the interruption with a time slot B until receiving a notification of mounting the sheet cassette. According to this manner, the notification of mounting the sheet cassette is obtained in a short time from a time point of the mounting the sheet cassette. The notification of mounting the sheet cassette may include a status of the sheet cassette (e.g. sheet size of a sheet stored in this sheet cassette, completion of lifting-up and/or the like). It should be noted that when such maintenance operation is detected while a job is performed, the controller 1 cancels or temporarily stops the job.

As mentioned, the image forming apparatus in Embodiment 1 includes the plural internal devices (the sheet feeding device 11, the duplex device 12, and the postprocessing device 13), the controller 1 that controls the plural internal devices, and the communication path 3 used for communication between the plural internal device and the controller 1. The usage priority of the communication path 3 is assigned to plural pieces of communication between the plural internal devices and the controller 1 in a time divisional manner. If the controller 1 detects a status change of the image forming apparatus, then the controller 1 interrupts the time divisional manner with a time slot of a specific internal device among the plural internal devices. This specific internal device corresponds to the status change.

Consequently, communication between the controller 1 and the specific internal device corresponds to the status change is preferentially performed, and thereby proper communication is performed adaptively for a status of the image forming apparatus.

Embodiment 2

In Embodiment 2, if the controller 1 detects as the aforementioned status change a start of a job that uses a part of the plural internal devices, the controller 1 continuously interrupts the time divisional manner with a time slot of a specific internal device used in the job until an end of the job, without interruption with a time slot of a specific internal device not used in the job. If plural specific internal devices are used in the job, then the controller 1 performs the interruption with time slots of the plural specific internal devices in a time divisional manner. In other words, among time slots of the plural specific internal devices, a time slot used in the interruption is selected in a time divisional manner.

Other parts of the configuration and behaviors of the image forming apparatus in Embodiment 2 are identical or similar to those in Embodiment 1, and therefore not explained here.

Figure 7:
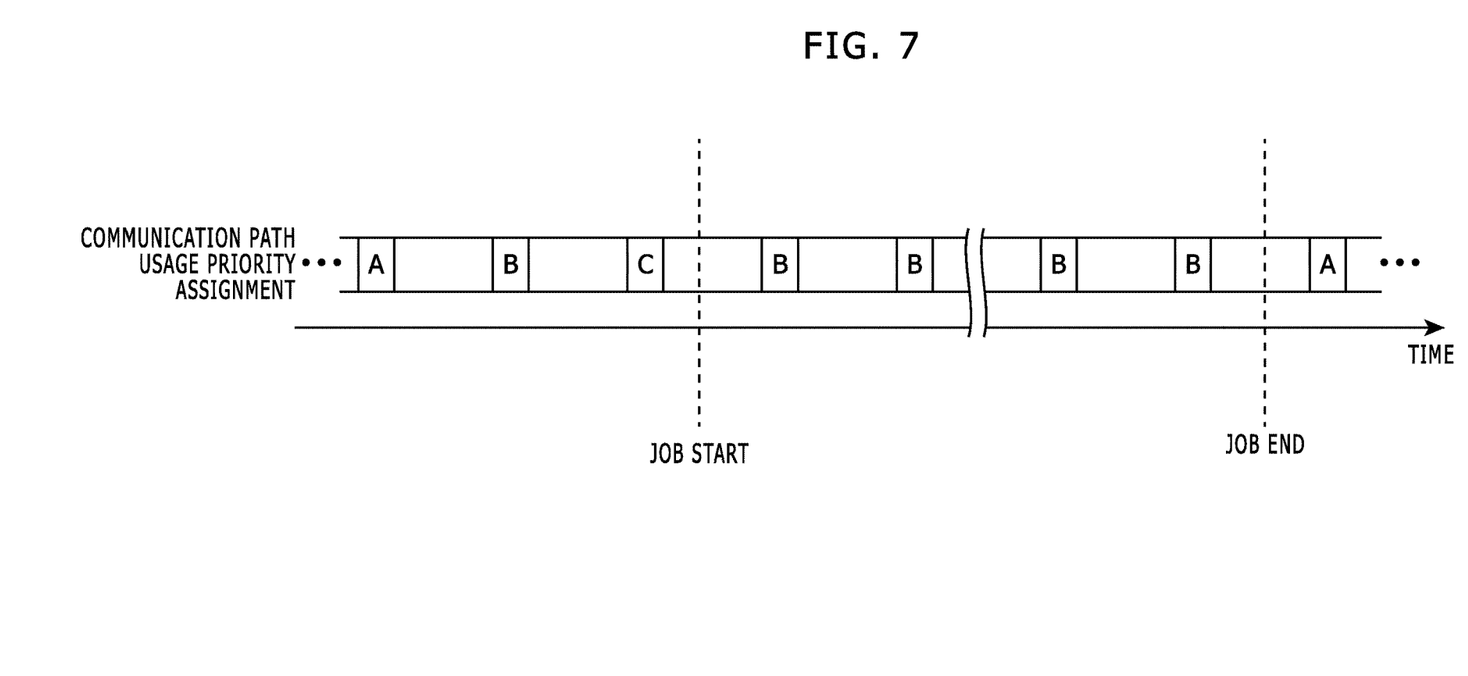
FIG. 7 shows a diagram that explains assignment of time slots while performing a job in Embodiment 2.

FIG. 7 shows a diagram that explains assignment of time slots while performing a job in Embodiment 2. For example, in a print job, if the sheet feeding device 11 is used but neither the duplex unit 12 or the postprocessing device 13 is used, then as shown in FIG. 7, the controller 1 continuously interrupt the time divisional manner with a time slot B of the sheet feeding unit 11 from a starting time point of the job to an ending time point of the job, and does not assign any time slots B and C of the duplex unit 12 and the postprocessing device 13.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned embodiments, as shown in FIG. 1, plural internal devices (the sheet feeding device 11 and the like) in the printing device 2 are connected to the controller 1 through the communication path 3. Alternatively or in addition, plural internal devices in another device (e.g. image scanning device or the like) may be connected to the controller 1 through another communication path, and communication control may be performed in the same manner.

What is claimed is:
1. An image forming apparatus, comprising:
plural internal devices;

a controller configured to control the plural internal devices; and a communication path used for communication between the plural internal devices and the controller;

wherein usage priority of the communication path is assigned to plural pieces of communication between the plural internal devices and the controller in a time divisional manner; and the controller detects a status change of the image forming apparatus, and upon detecting the status change, interrupts the time divisional manner with a time slot of a specific internal device among the plural internal devices, the specific internal device corresponding to the status change.

2. The image forming apparatus according to claim 1 wherein if the controller detects as the status change a start of a job that uses the specific internal device, the controller interrupts the time divisional manner with time slots of the specific internal device, and provides setting data for the job to the specific internal device through the time slots, the number of the time slots corresponding to a size of the setting data.

3. The image forming apparatus according to claim 1 wherein if the controller detects as the status change a request of an action command to the specific internal device, the controller interrupts the time divisional manner with a time slot of the specific internal device, and provides the action command to the specific internal device through the time slot.

4. The image forming apparatus according to claim 1 wherein if the controller detects as the status change a maintenance operation for the specific internal device, the controller continuously and repeatedly interrupts the time divisional manner with a time slot of the specific internal device until detecting termination of the maintenance operation, receives status information of the specific internal device through the time slot and thereby watches a status of the specific internal device, and detects the termination of the maintenance operation on the basis of the status information.

5. The image forming apparatus according to claim 1 wherein if the controller detects as the status change an error of the specific internal device, the controller interrupts the time divisional manner with a time slot of the specific internal device, and receives error information of the specific internal device through the time slot.

6. The image forming apparatus according to claim 1 wherein if the controller detects as the status change a start of a job that uses a part of the plural internal devices, the controller continuously interrupts the time divisional manner with a time slot of the specific internal device used in the job until an end of the job, without interruption with a time slot of a specific internal device not used in the job.

* * * * *